United States Patent [19]

Holland-Letz

[11] 4,453,999

[45] Jun. 12, 1984

[54] DEVICE FOR INTERMITTENTLY TRANSPORTING A TAPE PROVIDED WITH CONTROL RECESSES AT REGULARLY SPACED INTERVALS

[75] Inventor: Günter Holland-Letz, Hirschhorn, Fed. Rep. of Germany

[73] Assignee: Esselte Pendaflex Corporation, Garden City, N.Y.

[21] Appl. No.: 368,313

[22] Filed: Apr. 14, 1982

[30] Foreign Application Priority Data

Apr. 16, 1981 [DE] Fed. Rep. of Germany ....... 3115530

[51] Int. Cl.[3] ........................ B32B 31/00; B32B 31/04; B65H 25/00; B41F 1/08

[52] U.S. Cl. .................................... 156/361; 156/387; 156/541; 156/DIG. 33; 156/DIG. 49; 101/288

[58] Field of Search ............... 156/277, 352, 360, 361, 156/384, 387, 541, 540, 542, 475, 249, DIG. 33, DIG. 49, 510, 577, 579, 584; 101/291, 290, 289, 288; 400/618

[56] References Cited

U.S. PATENT DOCUMENTS

| | | | |
|---|---|---|---|
| 3,814,651 | 6/1974 | Wada | 156/541 |
| 4,056,424 | 11/1977 | Hamisch, Jr. | 156/541 |
| 4,173,420 | 11/1979 | Okabe | 400/618 |
| 4,191,608 | 3/1980 | Bussard et al. | 156/DIG. 33 |

*Primary Examiner*—Edward C. Kimlin

*Assistant Examiner*—Louis Falasco

*Attorney, Agent, or Firm*—Gerald J. Ferguson, Jr.; Joseph J. Baker

[57] ABSTRACT

The invention resides in the field of intermittently transporting of tapes, especially the transporting of tapes bearing adhesive labels in an apparatus by means of which the adhesive labels can be dispensed individually in succession and applied on an article. The device (14) used for transporting the tape includes a tape clamp movable forward and backward along the tape with a clamping member (31) movable between a tape clamping position and a tape releasing position and a counterclamp member (32); the tape (9) is passed between the clamping member (31) and the counterclamp member (32). The tape (9) is provided with control recesses (25) and the transporting device (14) comprises a control sensor (39) bringing the clamping member (31) into the tape clamping position when said sensor drops into a control recess (25). The control sensor (39) is movable relative to the clamping member (31) and is designed so that, when dropping into a control recess (25) it comes into positive engagement with the tape (9). Owing to the positive engagement between the tape (9) and the control sensor (39) the clamping member (31) held in the tape releasing position is moved into the tape clamping position. In this embodiment of the transporting unit a precisely defined instant of activation is attained when the tape clamp grips the tape (9) and carries it along.

4 Claims, 7 Drawing Figures

DEVICE FOR INTERMITTENTLY TRANSPORTING A TAPE PROVIDED WITH CONTROL RECESSES AT REGULARLY SPACED INTERVALS

The invention relates to a transporting device for intermittently transporting a tape which is provided with control recesses at regularly spaced intervals along its length and which is passed through a tape clamp movable forward and backward along the tape and including a clamping member movable between a tape clamping position and a tape releasing position and a counterclamp member, especially for transporting a tape bearing adhesive labels in an apparatus for dispensing said adhesive labels and for applying same on articles, said device comprising a control sensor sensing the tape and bringing the clamping member into the tape clamping position when said sensor drops into a control recess.

A known transporting device of this type in an apparatus for applying adhesive labels is used to intermittently advance a backing tape to which the adhesive labels adhere by a precisely defined length to thereby successively move one label after the other into a dispensing position where is can be applied on an article. To this end, the transporting device first must be moved oppositely to the advancing direction by a piece of length, and on its way back into its initial position it must grip the backing tape by means of the tape clamp and carry it along a predetermined length. It is important that the point where the tape clamp grips the backing tape is precisely determined in order that always precisely one label after the other reaches the dispensing position, rather than being carried beyond said dispensing position in case it is prematurely gripped, or not quite reaching said position in case it is gripped too late. Only if the gripping point of the tape clamp is precisely defined, a great number of labels successively arrive precisely at the dispensing position.

In the known transporting device the control sensor is rigidly connected to the clamping member. This implies that the control sensor starts to pivot the clamping member out of the tape releasing position into the tape clamping position at the moment the sensor drops into a control recess. At that point the tape clamp should not yet become effective because the control sensor is to enter the control recess to a certain extent in order to ensure safe detection of control recesses. After the control sensor has entered the control recess to the desired extent, the tape clamp is to become effective and to grip the supporting tape. In the known transporting device it may happen, especially when the motions are performed slowly, that the clamping member is carried along by uneven sections of the backing tape or by surface roughness and is pivoted into tape clamping position before the control sensor has fully entered the control recess. This causes undesirable premature activation of the tape clamp. After such premature activation of the tape clamp the transporting device carries the backing tape too far so that the adhesive label to be brought into dispensing position is advanced too far. This lack of synchronization is especially disadvantageous when in the apparatus the adhesive label is to be printed, e.g. provided with the price of the article to which it is to be applied. Of course, such printing should always be applied in the center of the label, which is not warranted in case of lacking synchronization.

The invention has the object of designing a transporting device of the initially defined type in such a way that the instant of tape clamp activation is precisely determined under all operating conditions.

According to the invention, this object is realized in that the control sensor is movable relative to the clamping member and is designed so that, when dropping into a control recess, it comes into positive engagement with the tape, and that the clamping member held in tape releasing position is brought into the tape clampingg position by the positive engagement between tape and control sensor.

In the transporting device of the invention the control sensor and the clamping member are movable independently of one another. This allows the control sensor, after having detected a control recess, to drop into the latter without immediately also moving the clamping member. Only when it has fully entered the control recess and is in positive engagement with the tape this positive engagement effects movement of the clamping member from the tape releasing position into the tape clamping position. In this way the desired precise instant of tape clamp actuation is achieved.

In an advantageous modification of the invention the control sensor and the clamping member are supported for pivoting about a common shaft mounted to a support, the support having a stop against which the clamping meember is held by a pressure spring in the tape releasing position, and the control sensor being movable toward the clamping member by the positive engagement.

For a supporting tape provided with two punched-out flaps each disposed side by side transverse to the tape length direction it is preferably contemplated that the control sensor has two blades for sensing the punched-out flaps, said blades corresponding in width to the width of the punched-out flaps and being spaced apart a distance corresponding to the distance between two punched-out flaps disposed side by side.

An embodiment of the invention will now be explained with reference to the drawing in which FIG. 1 shows a schematic side view of an apparatus in which the transporting device of the invention can be used;

Figure 1:
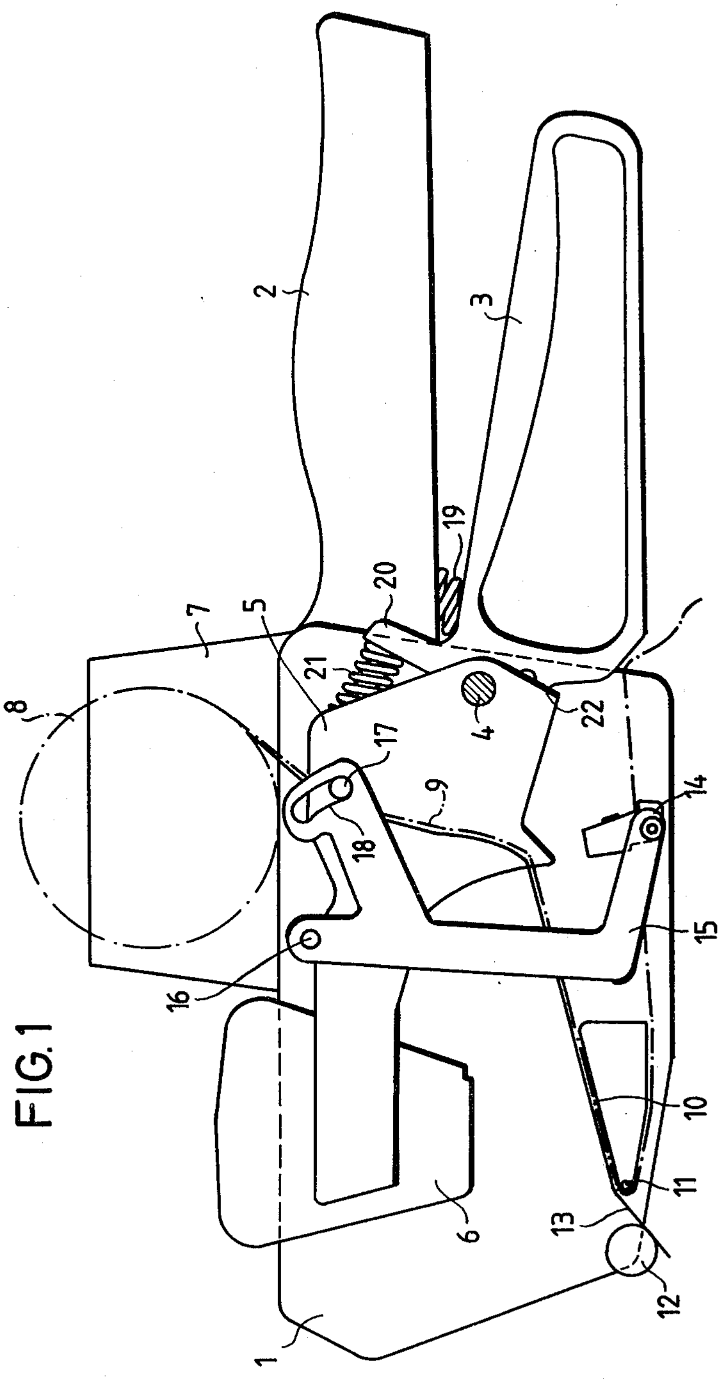

The apparatus illustrated in FIG. 1 serves to apply an adhesive label on an article, e.g. an article for sale in a store, printed with the price of the article. The apparatus comprises a housing 1 with a handle 2 and an operating lever 3 capable of being pulled toward said handle 2. In the housing 1 a printer lever 5 is pivotable about a shaft 4 and carries a printer 6 at its forward end. The shaft 4 is also the shaft about which the operating lever 3 pivots when pulled against the handle 2. In the top of the housing there is a cavity 7 for receiving a supply roll 8 of a backing tape 9 carrying adhesive labels. The backing tape 9 extends from the supply roll 8 first downwardly in the apparatus and then passes over a printing platen 10 toward the lower corner of the apparatus dispoed in FIG. 1 at the left side. At the end of the printing platen 10 disposed left in FIG. 1 the backing tape 9 is passed around a sharp deflecting edge 11 and then backwardly along the housing bottom. At the deflecting edge 11 the adhesive labels detach from the tape 9 and come into a dispensing position below an applicator roll 12. FIG. 1 shows an adhesive label 13 in dispensing position.

The adhesive label 13 shown in dispensing position in FIG. 1 can be applied on an article by rolling the applicator roll 12 over the article. In this way the adhesive label 13 sticks to the article. It can readily be detached from the backing tape 9 because the individual labels are separated from one another by cuts. In order to bring the next following adhesive label into the dispensing position the backing tape 9 must be pulled around the deflecting edge 11 by the length of one adhesive label. This is accomplished by a transporting device 14. Said transporting device 14 is supported by a lever 15 pivotable about a shaft 16 fixed in the housing. The motion of the pivoted lever 15 is effected by means of a control pin 17 fixedly connected to the printer lever 5 and affecting a cam 18 provided at the pivoted lever 15.

Before the construction of the transporting device 14 will be explained in more detail an operating cycle of the apparatus shown in FIG. 1 will be briefly described. When an adhesive label 13 in dispensing position has been applied on an article the operating lever 3 is pulled toward the handle 2 against the force of a spring 19. A projection 20 at the operating lever 3 compresses a spring 21 acting on the printer lever 5 and pivoting it counterclockwise about the shaft 4. The printer 6 is thereby lowered on the printing platen 10 and prints the adhesive label lying on said platen.

As the printer lever 5 is lowered the control pin 17, by engagement with the cam 18, pivots the lever 15 clockwise about the shaft 16. This causes the transporting device 14 to move along the backing tape 9 from the right-hand to the left-hand side in the embodiment shown in FIG. 1. When the operating lever 3 is released it returns to its initial position shown in FIG. 1 by the force of the spring 19, and a lug 22 at the operating lever 3 returns the printer lever 5 into its initial position shown in FIG. 1. By cooperation between the control pin 17 and the cam 18 the pivoting lever 15 moves the transporting device 14 backwardly along the backing tape whereupon it grips the backing tape owing to its construction to be described hereinafter and carries it along. As a consequence the backing tape 9 is drawn about the deflecting edge 11 so that the previously printed adhesive label is detached from the backing tape at said deflecting edge 11 and arrives at the dispensing position below the applicator roll shown in FIG. 1. The transporting device 14 intermittently advances the backing tape 9 a piece of length precisely corresponding to the length of an adhesive label.

Figure 2:
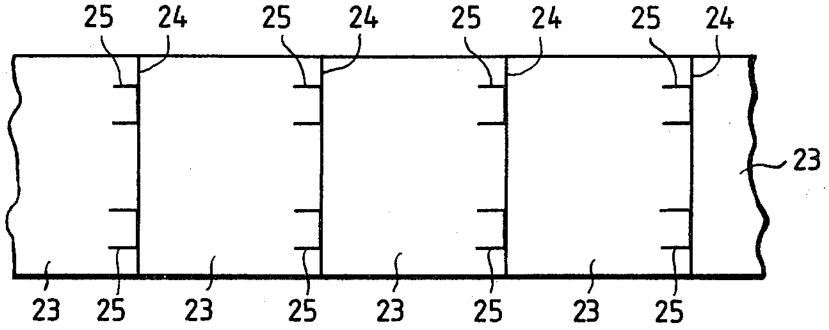
FIG. 2 shows a length of the tape to be transported by means of the transporting device of the invention.

A piece of length of backing tape with adhesive labels 23 attached thereto is shown in FIG. 2. As mentioned before, the adhesive labels are separated by severing cuts 24. In addition to said severing cuts 24 separating only the adhesive labels 23 flaps are punched out by cuts which extend through both the adhesive labels 23 and the backing tape 9. These punched-out flaps 25 serve as control recesses sensed by the transporting device 14 so that the latter can advance the backing tape in steps each coresponding to the length of one adhesive label.

Figure 3:
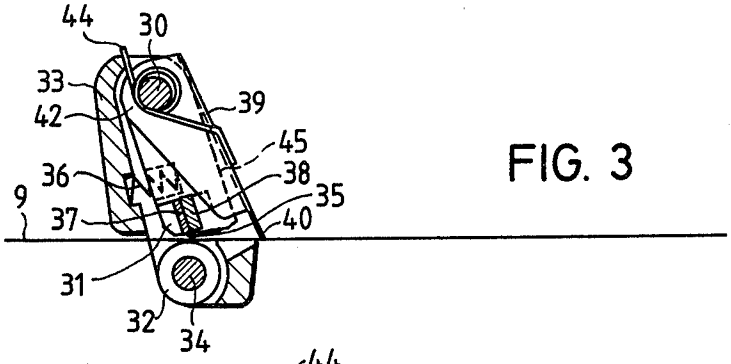
FIGS. 3 to 5 show partially in section lateral views of the transporting device of the invention in various phases of an operation cycle.
Figure 4:
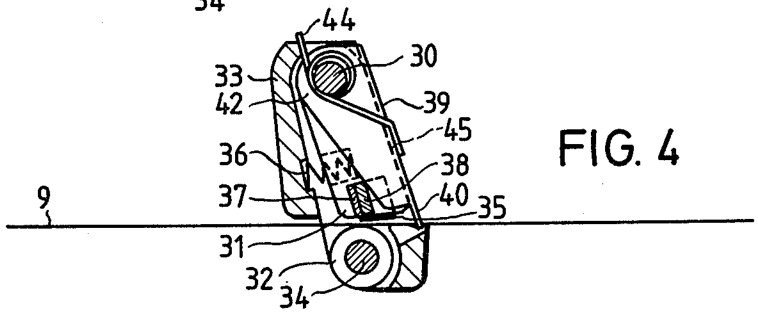
Figure 5:
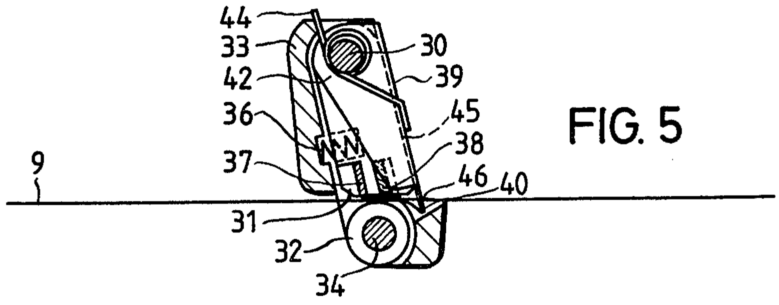

The transporting device sensing the backing tape 9 is shown in more detail in FIGS. 3 to 5. It comprises a clamping member 31 pivotable about a shaft 30 and a counterclamp member 32 in the form of a roll. As shown in the figure, the backing tape 9 passes between the clamping member 31 and the counterclamp member 32. The clamping member 31 and the counterclamp member 32 are mounted in a support 33 held by the pivotal lever 15. The support 33 and the pivotal lever 15 are connected by the shaft 34 about which also the counterclamp member 32 can rotate.

The clamping member 31, at its front face facing the backing tape 9, is provided with a brake block 35 which comes into contact with the backing tape 9 when the clamping member 31 pivots clockwise.

Figure 6:
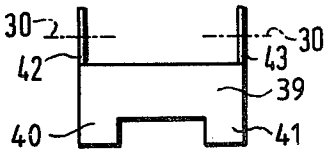
FIG. 6 is an illustration of the control sensor as shown in FIG. 3 seen from the right-hand side.
Figure 7:
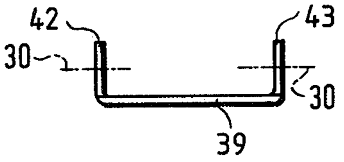
FIG. 7 is a plan view of the control sensor illustrated in FIG. 6.

Between the support 33 and the clamping member 31 there is a weak pressure spring 36 which urges the clamping member 31 in counterclockwise direction. At the clamping member 31 there is a lug 37 which comes to bear against a stop 38 formed at the support 33 as the clamping member 31 is pivoted counterclockwise. The lug 37 and the stop 38 permit movement of the clamping member 31 under the influence of the pressure spring 36 so that the brake block 35 is lifted from the backing tape 9 when the lug 37 bears against the stop 38. Hence, FIGS. 3 and 4 show the clamping member in releasing position where the advance of the supporting tape 9 between the clamping member 31 and the counterclamp member 32 is not obstructed by the brake block 35. On the shaft 30 a control sensor 39 is pivotally supported which serves to detect the punched-out flaps in the backing tape. The control sensor is shown in more detail in FIGS. 6 and 7. At its lower end contemplated for contacting the backing tape the control sensor 39 has two blades 40 and 41 corresponding in width to the width of the punched-out flaps 25 in the supporting tape. The two blades 40 and 41 are spaced apart a distance corresponding to the transverse spacing of two associated punched-out flaps 25. The control sensor 39 is bent on both sides to form tabs 42 and 43, and said tabs 42 and 43 contain apertures through which the shaft 30 extends. On the shaft 30 a torsion spring 44 is mounted which is seated against the support 33 and against the control sensor 39 so that its blades 40 and 41 are held toward the clamping member 31 in contact with the backing tape.

In FIG. 3 the transporting device 14 is shown in a position relative to the backing tape where there is no punched-out flap 25. This means that the blades 40 and 41 are held by the torsion spring 44 so as to contact the continuous surface of the backing tape 9. From FIG. 3 it may be seen that the control sensor 39 is lifted from the front face 45 of the clamping member 31 disposed on the right-hand side of FIG. 3 so that the torsion spring 36 has turned the clamping member 31 counterclockwise about the path maximally admitted by the stop 38. The individual parts of the transporting device 14 are in the positions shown in FIG. 3 when the transporting device 14 is moved by the pivoting lever 15 from right to left along the backing tape in the view shown in FIG. 1 and when the pivoting lever 15 then shifts the transporting device 14 from left to right along the backing tape 9 before the blades 40 and 41 get into the area of a punched-out flap 25.

In FIG. 4 the transporting device 14 is shown at a point along the backing tape 9 where the blades 40 and 41 commence to urge two punched-out flaps 25 downwardly under the influence of the torsion spring 44. The front edges of the blades 40 and 41 are disposed already below the plane of the backing tape 9 and the control sensor 39 has turned clockwise so far that it has come to lie against the front face 45 of the clamping member 31. The lug 37 still bears against the stop 38 which implies that the brake block 35 at the clamping member 31 is lifted off the supporting tape.

As the pivoted lever 15 continues to move the transporting device 14 along the backing tape 9 from left to right in the view of FIG. 1 (which corresponds to movement from left to right also in FIGS. 3 to 5) the blades 40 and 41 of the control sensor 39 come to lie against the cut edge 46 of the punched-out flaps 25 extending transverse to the backing tape. Owing to the positive engagement between the backing tape 9 and the control sensor 39 a great force is suddenly exerted on the latter so that it pivots the clamping member 31 clockwise against the action of the pressure spring 36. In the course of this pivotal motion the brake block 35 contacts the backing tape urging it against the counterclamp member 32. Since the distance between the shaft 30 and the front face of the brake block 35 is somewhat wider than the distance between the shaft 30 and the surface of the counterclamp member 32, self-locking occurs between the clamping member 31 and the counterclamp member 32 in the position shown in FIG. 5 which causes the clamping force exerted on the backing tape to increase as the force increases with which the transporting device 14 shown in FIG. 5 is pulled from left to right.

After the transporting device 14 has reachd the position shown in FIG. 5 further pivoting of the pivoting lever 15 causes the backing tape to be carried along on account of the clamping action so that an adhesive label detaches from the backing tape at the deflecting edge 11 and arrives at the position of the label 13 in FIG. 1. After having reached the position shown in FIG. 5 the pivoting lever 15 advances the transporting device 14 precisely by the length of one label with the consequence that in each operating cycle the transporting device 14 pulls the backing tape 9 about the deflecting edge 11 so far that precisely one label at a time arrives at the dispensing position below the applicator roll 12, after detaching from the backing tape 9.

The foregoing description of the transporting device 14 clearly shows that the control sensor 39 has the task of first detecting the presence of the punched-out flaps 25 in the backing tape 9 by pressing the flap punched out of the backing tape 9 below the plane of the backing tape under the action of the torsion spring 44. By the time the blades 40 and 41 of the control sensor 39 come into contact with the cut edge 46 of the punched-out flaps 25 they have entered the backing tape 9 so far that reliable positive engagement is ensured. The second task of the control sensor 39 now is to pivot the clamping member 31 into the tape clamping position whereupon said member rapidly undergoes self-locking and causes clamping of the backing tape 9. Due to the fact that the control sensor 39 and the clamping member 31 are movable about the shaft 30 independently of each other the functions of detecting the punched-out flaps and the release of the clamping engagement are separated from each other which ensures especially precise commencement of the clamping effect on the backing tape 9. The transition of the clamping member 31 from the tape releasing position to the tape clamping position indeed takes place only at the instant the control sensor 39 enters into positive engagement with the backing tape 9.

What is claimed is:

1. In a device for intermittently transporting tape bearing adhesive labels in an apparatus for dispensing said adhesive labels and for applying same on articles where said tape is provided with control recesses at regularly spaced intervals along its length where said device includes a tape feeding member which includes (a) a tape claim through which the tape is passed where the clamp is movable forward and backward along the tape and (b) a control sensor including engaging means for intermittently engaging said recesses to feed said tape through the apparatus during the said backward movement of the clamp along the tape and where said tape clamp includes (a) a clamping member movable between a tape clamping position and a tape releasing position and (b) a counter-clamp member and where said control sensor senses the recesses in the tape and brings the clamping member into the tape clamping position when said engaging means of the control sensor drops into a control recess, the improvement where the control sensor is movable relative to the clamping member so that (a), in response to the engaging means dropping into and positively engaging a control recess, the control sensor moves into contact with the clamping member and (b), in response to the control sensor engaging the clamping member, the clamping member is moved from the tape releasing position into the tape clamping position to effect positive feed of the tape through the apparatus.

2. The improvement according to claim 1 where the control sensor and the clamping member are supported for pivoting about a common shaft mounted to a support where the support has a stop against which the clamping member is held by a pressure spring in the tape releasing position, and where the control sensor is movable toward the clamping member by the positive engagement of the engaging means with the control recess.

3. The improvement according to claim 2 where the control sensor is held in contact with the tape by a torsion spring.

4. The improvement according to one of the preceding claims for a backing tape which has control recesses two punched-out flaps which are disposed side by side transverse to the tape length direction, characterized in that the engaging means of the control sensor includes two blades for sensing the punched-out flaps, said blades corresponding in width to the width of the punched-out flaps and being spaced apart a distance corresponding to the distance between the two punched-out flaps disposed side by side.

* * * * *